March 24, 1959    H. E. VAN VOORHEES    2,879,073
GOLF CART
Filed Feb. 23, 1956    2 Sheets-Sheet 1
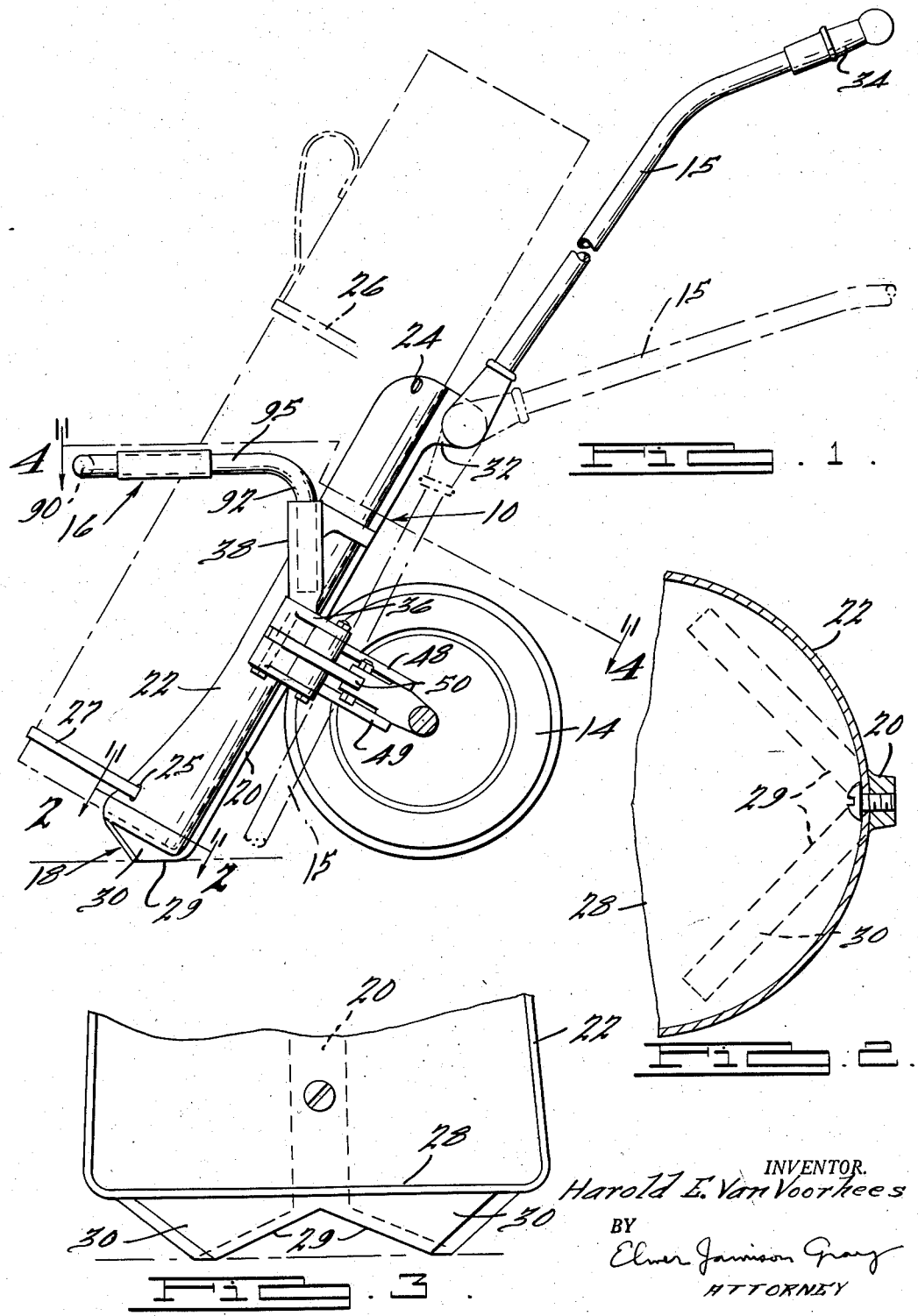
INVENTOR.
Harold E. Van Voorhees
BY
Elmer Jamison Gray
ATTORNEY

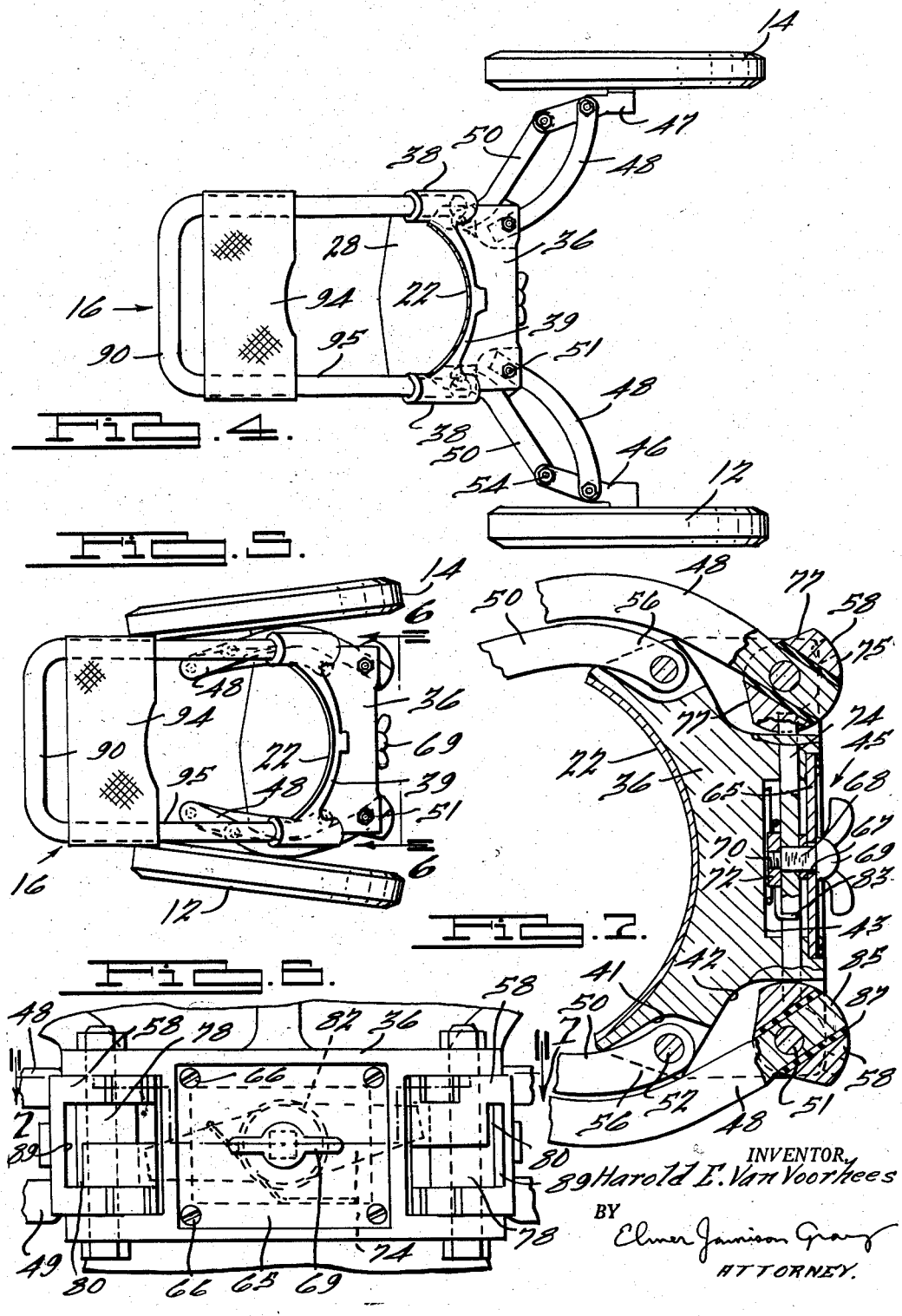

United States Patent Office 2,879,073
Patented Mar. 24, 1959

2,879,073
GOLF CART

Harold E. Van Voorhees, Grosse Pointe Woods, Mich.

Application February 23, 1956, Serial No. 567,401

4 Claims. (Cl. 280—42)

This invention relates to golf carts and is more particularly directed to wheeled supports for golf bags and the like, capable of being collapsed into a minimum of space.

An object of the invention resides in the provision of means for rigidly retaining the wheels in extended position or in retracted position, such means including a single double ended locking bar operable to selectively engage spaced detents in wheel pivot members to releasably retain the wheels in desired position.

Another object of the invention is to provide a simplified seat structure for a wheeled vehicle in which the weight of the occupant of the seat is principally borne directly from the supporting surface through the cart frame, the seat being positioned over a steady rest in such a manner that the weight is transmitted substantially vertically downward, the vehicle wheels serving to balance the occupant of the seat.

A further object of the invention is to provide a combined cart and seat structure capable of being pushed or pulled over the ground to carry golf bags or the like, the device incorporating a steady rest for engaging the ground to form a stable support for the cart when stationary, and the seat serving as a carrying handle when the cart is collapsed.

Further objects and advantages of the invention will become apparent from a study of the following description when taken with the accompanying drawings intended to be illustrative rather than restrictive and in which;

Figure 1 is a side elevational view of the golf cart constructed according to this invention;

Figure 2 is an enlarged sectional detail veiw taken on a line 2—2 of Figure 1;

Figure 3 is a fragmentary detail view, on an enlarged scale, of the support structure at the lower end of the cart shown in Figure 1;

Figure 4 is a sectional detail view taken substantially on a line 4—4 of Figure 1;

Figure 5 is a view similar to Figure 4 showing the wheels in retracted position;

Figure 6 is an enlarged fragmentary view in the direction of the arrows 6—6 in Figure 5; and Figure 7 is a sectional detail view on a line 7—7 of Figure 6.

Before explaining in detail the present invention it is to be understood that the invention is not limited in its application to the details of constuction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawings, a preferred structure is shown in which a golf cart indicated generally at 10 is provided with a pair of wheels 12 and 14 which not only support the vehicle for movement from place to place but also serve to assist in supporting the cart when stationary. The cart is also provided with a manipulating handle 15, a seat 16 the frame of which serves as a carrying handle, and a steady rest or support 18 for the cart when stationary and which, together with the wheels, serves as a stable support for the vehicle when used as a seat.

The golf cart 10 includes a central frame member or keel 20 to which is secured a shell or cradle 22 apertured at 24 and 25 to receive an upper golf bag encircling strap 26 adjacent the upper portion thereof and a lower golf bag encircling strap 27 adjacent the lower portion thereof. The cradle is generally semi-cylindrical and has a lower web end forming a shelf 28 upon which the bottom of the bag is disposed. The central member 20 is forked at its lower end to provide a triangular base 29 consisting of a pair of triangle shaped feet 30 which underlie the shelf to provide a firm support for the lower end of a golf bag and to engage the ground and steady the cart when not in motion. It will be seen that a golf bag can be readily secured in position as indicated in dotted lines in Fig. 1, and that the lower end of the golf bag is protected from being scuffed by contact with the ground.

The other end of keel 20 is enlarged at 32 to pivotally receive the cart pulling or pushing handle 15, having hand grip portion or member 34. The handle is adjustably attached for swinging movement from full line position to a completely collapsed position adjacent the keel 20 as shown in dotted lines. Intermediate the ends of member 20 is an attachment or bracket 36 to which are pivotally connected the wheel supporting structures. As particularly shown in Figs. 1 and 4 the bracket 36 is formed with a pair of upstanding angularly disposed tubular extensions 38 interconnected by a curved web portion 39 conforming in shape to that of the cradle 22. With particular reference to Figs. 6 and 7, the body portion of bracket 36 is slotted at 41 and 42 at each side to pivotally receive the wheel carrying structure, and recessed at 43 to receive the lock or latch mechanism 45 for retaining the wheel supporting structure in extended or retracted position as desired.

The wheels 12 and 14 are rotatably mounted on suitable spindles extending at right angles to arms 46 and 47, respectively. The wheels are retractable from their fully extended position as shown in Fig. 4 to a position closely adjacent the sides of the cradle 22 as shown in Fig. 5. This is accomplished by providing suitable linkage between the arms 46 and 47 and the bracket 36 such as a pair of vertically spaced links 48 and 49 and a link 50. The links 48 and 49 are connected to the bracket 36 by pivot 51 in the form of bolt 51 and to the arm 47 by a like pivot member intermediate the ends of the arm. The link 50 is disposed between the links 48 and 49 and is connected to the bracket 36 by means of pivot 52 and to the leading end of arm 47 by means of a pivot member 54. Links 48 and 49 are arcuately curved between their ends and link 50 has a curved end portion 56 adjacent its pivot 51 so that the links may lie closely adjacent the cradle 22 when the wheel is in retracted position. The other wheel 14 is similarly connected through its arm 48 to the other side of bracket 36.

The inner ends of the links are further attached to the brackets 36 and vertically spaced by means of semi-cylindrical rotary keeper members 58 which also serve as stops for limiting the movement of the wheels toward retracted or extended position. Keepers 58 are also provided with detent means to receive the ends of a locking bar as hereinafter described.

The lock structure 45 is substantially concealed in the recess 43 provided in the rear of bracket 36 by means of a cover or face plate 65 which is removably secured to the bracket by means such as screws 66. The plate 65 is centrally apertured at 67 to receive the squared shank 68 of a wing bolt 69 threaded at 70 to receive a retainer 72. Positioned on the shank 68 is a single double ended locking bar 74 rockable into and out of locking position with respect to the keepers 58 between which the bar is interposed as shown in Figs. 6 and 7.

Keepers 58 are provided with a cylindrical portion 75 and a pair of flat sides 77. A generally horizontal arcuate slot 78 is formed in the cylindrical portion 75, which slot terminates at each end in vertical slots 80 which serve as detents to receive the ends of bar 74. It will be noted that the slots 80 extend downwardly from the slot 78 in the left keeper 58, as viewed in Fig. 6 and that the right keeper is reversed so that slots 80 extend upwardly from the slot 78. Thus, when the ends of bar 74 are in locking position with respect to the detents 80, the bar is diagonally disposed as shown in dotted lines in Fig. 6. A single coil spring 82 encircles the retainer 72 and is provided with a hooked end 83 positioned to engage the upper edge of the bar 74 to urge the bar into locking position. Manipulation of wing bolt 69 clockwise rocks the ends of the bar 74 into the slot 78 in which position the wheel supporting structure may be manipulated to its other position.

The top and bottom surfaces of the keepers 58 are slotted at 85 to receive the inner ends of the upper and lower links 48 and 49. As particularly shown in Fig. 7, these inner ends of the links are covered with rubber or like material tips 87 to shock insulate the arms from the keepers.

Stops are provided by means of the side walls 89 of the ends of slots 78 to limit the rotary movement of the keepers upon contact with the ends of bar 74 when the latter is in unlocked position. Accordingly, the wheel supporting, retracting and extending structure is provided with stop means limiting its movement from one position to another.

The seat structure 16 consists principally of a tubular frame member 90 of generally U-shape with downturned depending ends or attaching legs 92 adapted to fit within the tubular extensions 38 of the bracket 36. A canvas or other fabric web portion is provided at 94 which spans and is secured to the sides 95 of the frame 90. As shown in Fig. 1, the seat web portion 94 is disposed outwardly from the cradle 22 of the cart and is substantially vertically above the steady rest 18. Thus, the rest 18 will support the weight of an occupant of the seat, the cart being further steadied by the wheels 12 and 14 in extended position, tripod fashion.

I claim:

1. A gold bag cart comprising an arcuate shell adapted to receive and embrace in part a golf bag and to extend a substantial distance in the length thereof, said shell terminating at one end in a base disposed in engagement by the lower end of the golf bag when in generally upright position, a supporting frame member for said arcuate shell extending longitudinally and exteriorly thereof at a locality substantially midway between the free edges of the shell, said frame member terminating at one end in supporting means underlying said base when the golf bag and shell are in generally upright positions, a handle pivotally connected to said frame member adjacent the opposite end thereof, laterally spaced wheel supports carried by said frame member intermediate the ends thereof, a pair of retractable wheels mounted on said supports, a seat adapted to overlie the base of said arcuate shell, and supporting members for said seat embracing said shell and secured to said frame member.

2. A golf bag cart comprising an arcuate shell adapted to receive and embrace in part a golf bag and to extend a substantial distance in the length thereof, said shell terminating at one end in a base disposed in engagement by the lower end of the golf bag when in generally upright position, a supporting frame member for said arcuate shell extending longitudinally and exteriorly thereof at a locality substantially midway between the free edges of the shell, said frame member terminating at one end in supporting means underlying said base when the golf bag and shell are in generally upright positions, a handle pivotally connected to said frame member adjacent the opposite end thereof, said frame member having an arcuate shell engaging member projecting laterally therefrom, a pair of retractable wheels mounted in spaced relation on said shell engaging member, and a seat adapted to overlie the base of said shell and including spaced supporting extensions at opposite sides of said shell connected to said shell engaging member.

3. A golf bag cart comprising an arcuate cradle to receive and embrace in part a golf bag and to extend a substantial distance in the length thereof, a supporting frame member for said cradle and to which the cradle is secured, said frame member extending longitudinally and exteriorly of the cradle at a locality substantially midway between the free edges thereof, supporting means for the golf bag when in generally upright position and secured to one end of the cradle, a handle pivotally connected to said frame member adjacent the opposite end of said cradle, laterally spaced wheel supports carried by said frame member intermediate the ends thereof, a pair of retractable wheels mounted on said supports, a seat adapted to overlie said supporting means, and supporting members for said seat embracing said cradle and secured to said frame member.

4. A golf bag cart comprising an arcuate cradle to receive and embrace in part a golf bag and to extend a substantial distance in the length thereof, a supporting frame member for said cradle and to which the cradle is secured, said frame member extending longitudinally and exteriorly of the cradle at a locality substantially midway between the free edges thereof, supporting means for the golf bag when in generally upright position and secured to one end of the cradle, a handle pivotally connected to said frame member adjacent the opposite end of said cradle, laterally spaced wheel supports carried by said frame member intermediate the ends thereof, a pair of retractable wheels mounted on said supports, a seat adapted to overlie said supporting means and including a U-shaped member having downwardly extending extensions embracing said cradle, and means secured to said frame member for supporting said extensions at opposite sides of the cradle.

References Cited in the file of this patent

UNITED STATES PATENTS

| | | |
|---|---|---|
| 1,198,593 | Stephens | Sept. 19, 1916 |
| 1,744,414 | Pflaum | Jan. 21, 1930 |
| 2,014,057 | Rogers | Sept. 10, 1935 |
| 2,438,078 | Sutphen | Mar. 16, 1948 |
| 2,531,902 | Baron | Nov. 28, 1950 |
| 2,610,072 | Head | Sept. 9, 1952 |
| 2,626,815 | Chamberlin | Jan. 27, 1953 |
| 2,629,429 | Baumfeld et al. | Feb. 24, 1953 |
| 2,673,589 | Kunkel | Mar. 30, 1954 |
| 2,725,240 | Johnson | Nov. 29, 1955 |